US008392310B1

(12) United States Patent  
Praisner et al.

(10) Patent No.: US 8,392,310 B1
(45) Date of Patent: Mar. 5, 2013

(54) SYSTEMS FOR AUTOMATED IDENTIFICATION AND PROCESSING OF QUALIFYING EXPENSES FOR TAX-ADVANTAGED ACCOUNTS AND AUTOMATED INITIATION OF RELATED ACCOUNT TRANSACTIONS

(75) Inventors: Christopher T. Praisner, Austin, TX (US); Duncan P. Van Dusen, Austin, TX (US); Mark C. Adams, Austin, TX (US); Melissa LoBiondo, Austin, TX (US); Michael R. McNally, Austin, TX (US); William M. Smith, Austin, TX (US)

(73) Assignee: Tango Health, Inc., Austin, TX (US)

( * ) Notice: Subject to any disclaimer, the term of this patent is extended or adjusted under 35 U.S.C. 154(b) by 148 days.

(21) Appl. No.: 12/944,042

(22) Filed: Nov. 11, 2010

Related U.S. Application Data

(60) Provisional application No. 61/336,966, filed on Jan. 28, 2010.

(51) Int. Cl.
G06Q 40/00 (2012.01)
(52) U.S. Cl. .................................................. 705/36 T
(58) Field of Classification Search ............... 705/35–45
See application file for complete search history.

(56) References Cited

U.S. PATENT DOCUMENTS

| 7,174,302 | B2 | 2/2007 | Patricelli et al. ................. 705/4 |
| 7,380,707 | B1 | 6/2008 | Fredman ...................... 235/379 |
| 7,493,266 | B2 | 2/2009 | Gupta ............................. 705/3 |
| 7,617,114 | B1 | 11/2009 | Tooke, III et al. ................ 705/2 |
| 7,624,026 | B2 | 11/2009 | DiPiero et al. .................... 705/2 |
| 7,680,679 | B1 | 3/2010 | Patricelli et al. ................. 705/2 |
| 7,743,979 | B2 | 6/2010 | Fredman ...................... 235/379 |
| 7,905,399 | B2 | 3/2011 | Barnes et al. ................. 235/381 |
| 7,912,735 | B1 | 3/2011 | Akin et al. ........................ 705/2 |
| 7,922,083 | B2 | 4/2011 | Harrison et al. ............. 235/381 |
| 2006/0036523 | A1 | 2/2006 | Stover et al. .................... 705/35 |
| 2006/0200397 | A1 | 9/2006 | Jaspers et al. .................. 705/35 |
| 2007/0203757 | A1 | 8/2007 | Dibiasi et al. .................... 705/4 |
| 2007/0219828 | A1 | 9/2007 | Schlicher et al. ................ 705/2 |
| 2010/0010901 | A1* | 1/2010 | Marshall et al. ............... 705/17 |
| 2012/0046976 | A1* | 2/2012 | Rourk .............................. 705/4 |

* cited by examiner

Primary Examiner — Thomas M Hammond, III
(74) Attorney, Agent, or Firm — O'Keefe, Egan, Peterman & Enders LLP

(57) ABSTRACT

Systems and methods are disclosed for automated identification and processing of qualifying expenses for tax-advantaged accounts and automated initiation of related account transactions for automated management of those tax-advantaged accounts. In part, the disclosed embodiments: identify expenditures which are eligible for tax-advantaged payment, withdrawal or reimbursement from a limited-purpose tax-advantaged account; store records with relevant details of expenditures to demonstrate eligibility for favorable tax treatment; calculate the amount of and executing contributions to limited-purpose tax-advantaged accounts as a function of account holder preferences, statutory limits and prospective or prior qualifying expenditures from other accounts; identifying withdrawals from limited-purpose tax-advantaged accounts which do not qualify for the tax advantage and restoring those monies to the account or offsetting them against amounts otherwise reimbursable from the account; and automatically reimbursing the account holder from his limited-purpose tax-advantaged account as a function of account holder preferences, information about qualifying expenditures made from another account or contributions to the account.

33 Claims, 12 Drawing Sheets

| ELECTRONIC TRANSACTION RECORDS ||||||| 
|---|---|---|---|---|---|---|
| TXN REFID | TXN SOURCE | DATE | MERCHANT | AMOUNT | MCC | CARD ISSUER TXN# |
| T1001 | HSA | 02/12/2009 | MINUTE CLINIC | $65.00 | 8099 | 231654889 |
| T1002 | AMEX | 02/15/2009 | DISCOUNT TIRE #781 | $82.87 | 5532 | 4323567787890012 |
| T1003 | AMEX | 02/18/2009 | EXPRESS SCRIPTS | $73.29 | 5912 | 4358853112456781 |
| T1004 | VISA | 02/22/2009 | CHICK-FIL-A | $13.37 | ---- | 701126658901 |
| T1005 | VISA | 02/22/2009 | KEITH NOVY, DDS | $125.00 | ---- | 701136345461 |

FIG. 9

| ACCOUNT ACTIVITY TABLE |||||||
|---|---|---|---|---|---|---|
| INT REF # | TXN TYPE | DATE | MEMO | AMOUNT | IRS CODE | CUSTODIAN REF# |
| H2001 | DEPOSIT | 01/15/2009 | 2009 CONTRIBUTION | $100.00 | | 120150001 |
| H2002 | WITHDRWL | 02/12/2009 | MINUTE CLINIC | $65.00 | | 120150002 |
| H2003 | ROLLOVER | 02/18/2009 | ROLLOVER | $1158.92 | 4 | 120150003 |
| H2004 | FEE | 02/22/2009 | ACCOUNT FEE | $3.50 | | 120150004 |
| H2005 | WITHDRWL | 03/02/2009 | APPINIT#1234 | $100.00 | | 120150005 |

FIG. 10

| QUALIFYING EXPENSE TABLE ENTRIES ||||||||| |
|---|---|---|---|---|---|---|---|---|
| UNIQUE ID | TXN SOURCE | TXN REFID | DATE | MERCHANT | AMOUNT | MCC | IMAGES/ COMMENTS | SUBSTANTIATION AUDIT LOG (IF REQUIRED) |
| Q5001 | HSA | T1001 | 02/12/2009 | MINUTE CLINIC | $65.00 | 8099 | C4001,I4001 | S4001 |
| Q5002 | MANUAL |  | 02/15/2009 | THERAPY | $110.00 | ---- | C4002,I4002 | S4002 |
| Q5003 | AMEX | T1003 | 02/18/2009 | EXPRESS SCRIPTS | $73.29 | 5912 | C4003,I4003 | S4003 |
| Q5004 | VISA | T1005 | 02/22/2009 | KEITH NOVY, DDS | $125.00 | ---- | C4004,I4004 | S4004 |

FIG. 11

| SUBSTANTIATION WORK QUEUE ENTRIES ||||||||
|---|---|---|---|---|---|---|---|
| UNIQUE ID | TXN SOURCE (1204) | TXN REFID | DATE | MERCHANT | AMOUNT | MCC | IMAGES/ COMMENTS (1202) |
| Q5001 | HSA | T1001 | 02/12/2009 | MINUTE CLINIC | $65.00 | 8099 | C3001 |
| Q5002 | MANUAL |  | 02/15/2009 | THERAPY | $110.00 | ---- | C3002,I3002 |
| Q5003 | AMEX | T1003 | 02/18/2009 | EXPRESS SCRIPTS | $73.29 | 5912 |  |
| Q5004 | VISA | T1005 | 02/22/2009 | KEITH NOVY, DDS | $125.00 | ---- | C3003,I3004 |
| Q5005 | VISA | T1004 | 02/22/2009 | CHICK-FIL-A | $13.37 |  |  |

FIG. 12

| SUBSTANTIATION AUDIT LOG ||||||
|---|---|---|---|---|---|
| ENTRY ID | UNIQUE ID | REVIEWER ID | SUBSTANTIATION DISPOSITION | SUBSTANTIATION DATE | SUPPORTING INFO |
| S4001 | Q5001 | REVIEWER#1 | APPROVED | 02/12/2009 | C3001,I3001 |
| S4002 | Q5002 | REVIEWER#2 | APPROVED | 02/15/2009 | C3002,I3002 |
| S4003 | Q5003 | REVIEWER#1 | APPROVED | 02/18/2009 | C3003,I3003 |
| S4004 | Q5004 | REVIEWER#2 | IN PROCESS |  | C3004,I3004 |
| S4005 | Q5005 | REVIEWER#1 | ABANDONED | 03/02/2009 | C3005,I3005 |

FIG. 13

SYSTEMS FOR AUTOMATED IDENTIFICATION AND PROCESSING OF QUALIFYING EXPENSES FOR TAX-ADVANTAGED ACCOUNTS AND AUTOMATED INITIATION OF RELATED ACCOUNT TRANSACTIONS

RELATED APPLICATIONS

This application claims priority to U.S. Provisional Patent Application Ser. No. 61/336,966, filed Jan. 28, 2010, and entitled "SYSTEMS AND METHODS FOR AUTOMATED MANAGEMENT OF TAX-ADVANTAGED ACCOUNTS," which is hereby incorporated by reference in its entirety.

TECHNICAL FIELD OF THE INVENTION

This invention relates to systems and methods for managing tax advantaged accounts including systems and methods for managing consumer purchases and expenditures related to tax advantaged accounts.

BACKGROUND

Certain Financial institution custodians and other administrators of limited-purpose tax-advantaged accounts and arrangements such as 529 Plans (529s), Coverdell Education Savings Accounts (ESAs), Health Savings Accounts (HSAs), Medical Savings Accounts (MSAs), Health Reimbursement Arrangements (HRAs), and Flexible Spending Arrangements (FSAs) provide one of two primary methods for making withdrawals from the accounts, and certain methods of otherwise managing the accounts.

The first method for making withdrawals (generally offered with 529s and ESAs) does not permit the account holder or beneficiary to make withdrawals self-sufficiently; they must contact the custodian and direct disbursement of funds in a lump-sum to another account they control rather than directly to the supplier of the goods or services which qualify for favorable tax treatment. This process could be termed prospective reimbursement.

The second method for making withdrawals (generally offered with HSAs and FSAs) involves a standard combination of withdrawal methods commonly used with traditional demand deposit accounts including: checks, debit cards, on-line bill pay applications, and on-line transfers. Under this method, account holders can choose to pay the supplier of the goods or services which qualify for favorable tax treatment directly, to disburse money to another account they control and from which they have effected payment to the qualifying supplier, or to otherwise reimburse themselves for a qualifying expense. IRS Publication 969 describes the acceptability of reimbursing oneself from an HSA for qualifying expenses paid outside the HSA. This process could be termed retrospective reimbursement.

Custodians of limited-purpose tax-advantaged accounts often provide other methods for managing the account, including the ability for the account holder to view statements on-line, and to enter notes including recording information regarding the qualification or non-qualification of a withdrawal. In the case of HSAs, some custodians allow account holders the ability to upload images of expenditure receipts as part of their notes.

The total set of account management methods currently provided by custodians of limited-purpose tax-advantaged accounts has at least five shortcomings. First, there are no methods for account holders to identify or keep records surrounding any qualifying tax-advantaged expenditures which may be made: (i) from another account and are permitted to be reimbursed from the limited-purpose account (in the case of retrospective reimbursement), or (ii) against a balance already withdrawn from the limited-purpose account (in the case of prospective reimbursement). This shortcoming burdens the use of limited-purpose accounts and places a substantial record-keeping requirement on the account holder with no information technology tools to discharge it.

A second shortcoming of existing account management methods is that custodians of limited-purpose tax-advantaged accounts do not offer any methods for account holders to calculate the amount of or execute contributions to limited-purpose accounts (either directly or from payroll deductions at the account holder's employer if permitted) as a function of the account holder's saving goals, Federally-established contribution limits, and/or projected or prior expenditures from other accounts which qualify for prospective or retrospective reimbursement from the limited-purpose account. This limitation places a research, calculation and execution burden on the account holder to maximize the financial efficiency of their contributions to the account.

A third shortcoming of existing account management methods is that custodians of limited-purpose tax-advantaged accounts do not offer any methods for account holders to determine which withdrawals may not have been qualifying for purposes of restoring money to the limited-purpose tax-advantaged account or offsetting the total otherwise reimbursable from the limited-purpose tax-advantaged account. This limitation also creates a record-keeping and possibly a tax burden to the account holder.

A fourth shortcoming of existing account management methods is that custodians of limited-purpose tax-advantaged accounts do not offer any methods for automating reimbursements to the account holder based on information about: (i) qualifying expenditures made from another account or (ii) contributions to the limited-purpose tax-advantaged account. Thus the account holder must request a reimbursement each time such an event happens and cannot issue standing reimbursement orders to the custodian. This limitation places a time, scheduling, and cash flow burden on the account holder.

A fifth shortcoming of existing account management methods is that, in the case of limited-purpose accounts for which the custodian offers only prospective reimbursement, the custodian provides no methods for making direct payment of qualifying expenses; rather, money must be withdrawn in a lump sum and qualifying expenses paid individually out of another account. There are no custodian-provided methods for effecting these payments or keeping records for tax and audit purposes. This limitation places an additional record-keeping burden on the account holder.

SUMMARY OF THE INVENTION

Systems and methods are disclosed for automated identification and processing of qualifying expenses for tax-advantaged accounts and automated initiation of related account transactions for automated management of those tax-advantaged accounts. In part, the disclosed embodiments provide systems and methods for: (i) identifying expenditures which are eligible for tax-advantaged payment, withdrawal or reimbursement from a limited-purpose tax-advantaged account; (ii) keeping and storing records with the relevant details of those expenditures to demonstrate their eligibility for favorable tax treatment; (iii) calculating the amount of and executing contributions to limited-purpose tax-advantaged accounts as a function of account holder preferences, statutory limits and prospective or prior qualifying expenditures from other accounts; (iv) identifying withdrawals from limited-purpose tax-advantaged accounts which do not qualify for the tax advantage and restoring those monies to the account or offsetting them against amounts otherwise reimbursable from the account; and (v) automatically reimbursing the account holder from his limited-purpose tax-advantaged account as a function of account holder preferences, information about qualifying expenditures made from another account or contributions to the account.

In certain embodiments, disclosed systems and methods provide for identification, storage, and retrieval of expenses which are associated with tax-advantaged accounts and eligible for qualifying withdrawal according to tax laws governing the tax-advantaged account.

In further embodiments, disclosed system and methods accept multiple disparate sources of data applicable to tax-advantaged accounts and transform that data into a consistent history of expenses eligible for qualifying withdrawal, and offsetting withdrawals, with that history being available to account holders over a secure communication channel and suitable for substantiating qualifying withdrawals from tax-advantaged accounts.

Still further, systems and methods are disclosed for automating the identification of expenses eligible or ineligible for withdrawal by utilizing information contained in multiple sources of electronic data applicable to tax-advantaged accounts in accordance with account holder preferences.

Systems and methods are also disclosed for calculating and executing contributions to limited-purpose tax-advantaged accounts as a function of account holder preferences, statutory limits and prospective or prior qualifying expenditures from other accounts.

Further embodiments provide a systems and methods for automating qualifying withdrawals in accordance with account holder preferences, accumulated expenses eligible for withdrawal and offsetting withdrawal history stored electronically in the system, including the ability to automatically trigger qualifying withdrawals in the future based on future contributions and future identification of expenses eligible for withdrawal relative to the available account balance and a minimum account balance target set by the account holder or custodian.

Additional objects and advantages of the disclosed embodiments will be set forth in the description which follows, and in part will be obvious from the description, or may be learned from the practice of the disclosed embodiments.

To achieve the advantageous features described herein, and in accordance with the embodiments described herein, tax-advantaged account management systems of programmed and networked computing and data storage devices are configured for management of tax-advantage accounts, including manual and automated identification of expenses eligible for withdrawal, aggregate expense tracking and storage, automation of withdrawals, and aggregated withdrawal tracking and storage associated with limited-purpose tax-advantaged accounts is provided. Further, these systems and methods can be configured to take as input multiple disparate sources of data applicable to the account, received over multiple communication channels, and transform that data into a consistent history of qualifying expenses eligible for withdrawal and actual withdrawals relating to a tax-advantaged account. Further still, the disclosed systems and methods can provide a method for automating the identification of expenses eligible for withdrawal by utilizing information contained in multiple sources of data applicable to the account in conjunction with account holder preferences stored in the databases of the system. Additionally, the disclosed systems and methods can be configured to automate account holder withdrawal from tax-advantaged accounts based on the expense and withdrawal data stored in databases, including the ability to automatically trigger withdrawals in the future based upon the future arrival of contributions and qualifying expenses eligible for withdrawal, in conjunction with account holder preferences stored in the databases of the system. Systems and methods can also be provided for calculating and executing contributions to limited-purpose tax-advantaged accounts as a function of account holder preferences, statutory limits and prospective or prior qualifying expenditures from other accounts.

Further embodiments provide systems and methods for allowing a third party reviewer tasked with substantiating account holder expenses eligible for withdrawal to utilize the data stored in the databases of the system to substantiate individual expenses prior to releasing withdrawals or to perform an audit of previous withdrawals, including the ability to solicit clarification from the account holder as required using the system as a self-documenting communication channel and storage of those communications in the databases of the system.

Still further embodiments provide systems and methods for utilizing aggregated expense information spanning a multitude of tax-advantaged accounts whose activity is contained in the databases of the system for automated identification and disposition of expenses on behalf of individual account holders (community sentiment), in conjunction with account holder preferences stored in the databases of the system.

An account initialization phase can also be provided wherein account activity for an existing tax-advantaged account is initially communicated to the system and subsequently updated via a periodic transmission from the account's financial custodian over a secure communication channel. The tax-advantaged account information transmitted by the financial custodian includes data such as identification of the account holder, account establishment date, account deposits, withdrawals, current balance, interest earned, and transfers to and from other accounts.

In further embodiments, once the account initialization phase has been completed for a limited-purpose tax-advantaged account, that account becomes available in the system for access by the account holder. Once the account is available in the system, the account holder may provide preference data and establish automation and communication preferences pertaining to that account within the system via secure communication channel such as the INTERNET. The account holder may subsequently update these system preferences at any time.

In still further embodiments, the periodic account activity provided by the financial custodian of the tax-advantaged account is one source of data applicable to the account. The account holder may identify multiple additional data sources from which data will be retrieved by the system utilizing a secure communication channel. These additional data sources are credit cards but could also be debit cards or other financial accounts in future embodiments.

Still further, data received from the financial custodian of the tax-advantaged account and data automatically retrieved from other data sources identified by the account holder, such as credit cards, describing transactions are evaluated using parameters of merchant name, merchant category code, keywords in the transaction description and user preferences to identify those transactions which will become expenses, those transactions which require further action by the account holder, and those transactions which can be discarded. Additionally, embodiments can utilize community sentiment, preference data from the community of account holders utilizing a common set of merchants, to further identify those transactions from common merchants which will become expenses, those transactions which require further action by the account holder, and those transactions which can be discarded as ineligible for favorable tax treatment.

In other embodiments, another data source is the account holder, who uses a secure communication channel such as the INTERNET to access the system and to provide preference and expense data directly to the system.

Still further, expense data entered by the account holder can include manual entry of expenses not received from other data sources, manual enhancement of data from other sources, such as credit cards, configuration of future processing options on merchants included in data from other sources, and receipt images associated with expenses. Manual enhancement of data from other sources by the account holder includes enhanced transaction descriptions, tags for identifying and categorizing expenses, qualifying subtotals for expenses derived from transactions which include both qualifying and non-qualifying items.

The disclosed embodiments further provide identification and storage of expense and withdrawal history for the account holder of a limited-purpose tax-advantaged account. This allows disclosed embodiments to track and present to the account holder the amount of the balance of the limited-purpose tax-advantaged account that is eligible and available for favorable tax treatment upon withdrawal. When a qualifying expense is recorded in the system, either automatically (FIG. 4) or manually (FIG. 5), the account holder's qualifying expense accumulator is incremented by the amount of the newly added expense. Disclosed embodiments can be configured to identify the account holder's qualifying expenses paid directly from the limited-purpose tax-advantaged account and also from other payment sources, such as credit cards or general purpose checking accounts, identified by the account holder. Over time, as multiple qualifying expenses are recorded and updated, the value in the qualifying expense accumulator is updated to reflect the net amount of qualifying expenses supplied to the system via both manual and automated channels. Withdrawals from the limited-purpose tax-advantaged account, including those qualifying expenses that are paid directly from the limited-purpose tax-advantaged account through check, debit card, ACH or on-line bill pay directly to the merchant or service provider as identified in above, are included in the account holder's lifetime withdrawal accumulator. Any update to either the qualifying expense accumulator or the lifetime withdrawal accumulator triggers a recalculation of the amount eligible for withdrawal from the limited-purpose tax-advantaged account. The amount eligible for withdrawal is calculated as the minimum of the qualifying expense accumulator minus the lifetime withdrawal accumulator. The amount available for withdrawal is calculated as the minimum of the amount eligible for withdrawal or the limited-purpose tax-advantaged account balance, subject to minimums set in the system by the account holder or custodian.

In further embodiments, based on account holder preferences stored in the databases of the system, transactions included in account activity from the financial custodian of the limited-purpose tax-advantaged account and transactions periodically retrieved from external payment sources, such as credit cards or general purpose checking accounts, may be automatically recorded as qualifying expenses. Similarly, also based on account holder preferences stored in the databases of the system, transactions included in account activity from the financial custodian of the limited-purpose tax-advantaged account and transactions periodically retrieved from external payment sources, such as credit cards or general purpose checking accounts, may be discarded as non-qualifying or held for manual disposition by the account holder. As the account holder identifies qualifying expenses among the transactions that the system has received directly from the financial custodian of the limited-purpose tax-advantaged account or directly from external payment sources that the account holder has registered, such as credit cards, the account holder may configure the system such that future transactions from that same merchant are automatically identified as qualifying expenses. Similarly, as the account holder discards transactions that the system has received directly from the financial custodian of the limited-purpose tax-advantaged account or directly from external payment sources that the account holder has registered, such as credit cards, the account holder may configure the system such that future transactions from that same merchant be automatically discarded with no need for further review. Additionally, the account holder may configure the system such that individual merchants are held by the system for further review by the account holder. Over time, the account holder provides preference data on multiple individual merchants. As future transactions from merchants for which preferences stored in the system arrive in the system, those transactions are automatically qualified, held for review, or discarded by the system in accordance with the account holder's stored preferences and the account holder is only required to disposition transactions from previously unseen merchants and from merchants whose preference setting is to hold transactions for account holder review.

In still further embodiments, the account holder may configure preferences that control system-initiation of withdrawals, constrained by the account holder's amount eligible for withdrawal and amount available for withdrawal. Using this mechanism, the account holder may identify a destination account where withdrawals are to be deposited by the system. The account holder may initiate withdrawals from the limited-purpose tax-advantaged account via ad hoc communication with the system over a communication channel such as the INTERNET or the account holder may configure the system to automatically initiate withdrawals when certain criteria are met. If the account holder configures the system for automated withdrawals, the system will initiate periodic withdrawals from the limited-purpose tax-advantaged account subject to the constraints of the amount eligible for withdrawal, the amount available for withdrawal, and any minimum balance that the account holder or custodian has directed the system to maintain in the limited-purpose tax-advantaged account.

One typical scenario for the disclosed systems and methods includes identification and storage of qualifying expense and withdrawal history for the account holder who desires to maximize the account balance of the limited-purpose tax-advantaged account in order to maximize favorable tax treatment of the account. This type of account holder is intentionally paying qualifying expenses with payment sources other than the limited-purpose tax-advantaged account, maximizing the balance of the tax-advantaged account and deferring withdrawals for the purpose of reimbursement until some future date. In this scenario the account holder initiates one or more retrospective reimbursements via the system at some point in the future, within the constraints of the available balance of the tax-advantaged account and the accrued qualifying expenses available for withdrawal.

In this scenario, the account holder makes tax-advantaged contributions to the limited-purpose tax-advantaged account over time but does not pay qualifying expenses directly from the limited-purpose tax-advantaged account. Instead the account holder pays qualifying expenses from payment sources other than the limited-purpose tax-advantaged account and utilizes the system for identification of these qualifying expenses. In this scenario, the primary source of the account holder's qualifying expenses may be a general purpose credit card, which is identified in the system preference data communicated by the account holder. The account holder may also identify qualifying expenses to the system by communicating data for individual qualifying expenses on an ad hoc basis via the data interfaces provided by the system. Further, the account holder may also identify qualifying expenses to the system by communicating the data identifying the expenses to the system in a standard data format supported by the system. Over time, multiple qualifying expenses are identified in the system and the account holder's qualifying expense accumulator grows to reflect the total amount of qualifying expenses. Because the account holder in this example is not making withdrawals from the limited-purpose tax-advantaged account as these qualifying expenses are identified, the account holder's amount eligible for withdrawal increases over time in tandem with the increase in the account holder's qualifying expense accumulator. At a point in the future of the account holder's choosing, the account holder requests a reimbursement via the system. The system, within the constraints of the amount eligible for withdrawal and the amount available for withdrawal, withdraws the appropriate amount from the limited-purpose tax-advantaged account and deposits that amount into another account identified by the account holder by preference data in the system. The action of withdrawal updates the system's lifetime withdrawal accumulator, which triggers the system's recalculation of the new net amount eligible for withdrawal from the limited-purpose tax-advantaged account.

A similar scenario could be practiced that involves the case where the limited-purpose tax-advantaged account only allows prospective reimbursement with the variation that qualifying expenses would be accumulated relative to an already-withdrawn amount rather than an amount eligible for future withdrawal.

Another typical scenario for the disclosed embodiments includes identification and storage of expense and withdrawal history for the account holder who is paying some qualifying expenses directly from the tax-advantaged account, but is paying other expenses with a payment source other than the tax-advantaged account. In this scenario the system automates withdrawals to reimburse the account holder for expenses paid with a payment source other than the tax-advantaged account, within the constraints of the available balance of the tax-advantaged account and the accrued reimbursable amount. If the accrued reimbursable amount exceeds the available balance of the tax-advantaged account, the system will initiate, either automatically or on-demand according to account holder preferences, future retrospective reimbursements as the available balance of the tax-advantaged account increases.

A further typical scenario for the disclosed embodiments includes identification and storage of expense and withdrawal history by the account holder who is paying all qualifying expenses with a payment source other than the tax-advantaged account and maintaining a near-zero balance in the limited-purpose tax-advantaged account. This type of account holder funds the tax-advantaged account in arrears for subsequent tax-advantaged retrospective reimbursement of expenses already incurred. In this scenario the system automates future withdrawals to reimburse the account holder for expenses paid with a payment source other than the tax-advantaged account, within the constraints of the available balance of the tax-advantaged account and the accrued reimbursable amount. If the accrued reimbursable amount exceeds the available balance of the tax-advantaged account, the system will initiate future reimbursements as the available balance of the tax-advantaged account increases, allowing the account holder to deposit only those funds which are due to be reimbursed. In this scenario, the system may facilitate reimbursement by generating a pair of synchronized offsetting ACH debit and credit transactions which post to the tax-advantaged account simultaneously. The advantage of the method of using offsetting ACH transactions is that this method results in retrospective reimbursement from a tax perspective without attaching funds from another account.

Still another typical scenario for the disclosed embodiments includes account holder interaction with a third party to substantiate expenses prior to withdrawal. In situations where third party review is required to substantiate qualifying expenses prior to releasing funds from the limited-purpose tax-advantaged account, the disclosed embodiments provide secure communication channels for supporting information, including archival of substantiating interactions, and approval tracking of qualifying expenses.

DESCRIPTION OF THE DRAWINGS

In order that the manner in which the above-recited and other advantages of the objects of the inventions are obtained, a more particular description of the disclosed embodiments briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings.

FIG. 9 is a sample table of transaction data records received from multiple data sources.

FIG. 10 is a sample table of tax-advantaged account activity received from a financial custodian.

FIG. 11 is a sample table of expenses associated with a tax-advantaged account.

FIG. 12 is a sample table of substantiation work queue items.

FIG. 13 is a sample of a substantiation audit log.

DETAILED DESCRIPTION

Figure 1A:
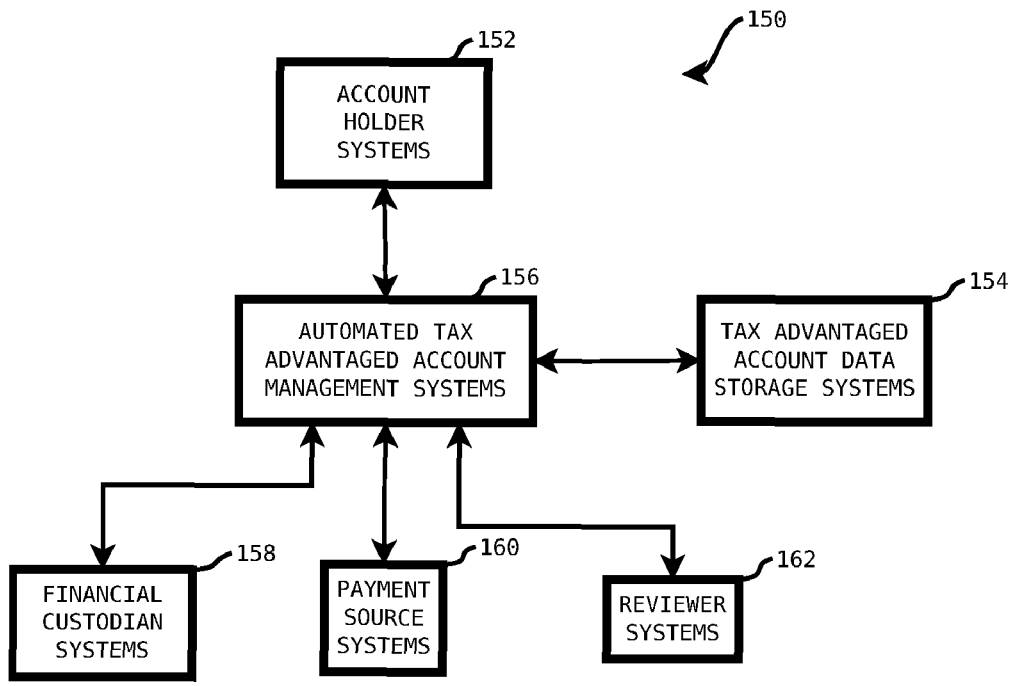
FIG. 1A is a block diagram for an embodiment including account holder systems and automated tax-advantaged account management systems.

Systems and methods are disclosed for automated identification and processing of qualifying expenses for tax-advantaged accounts and automated initiation of related account transactions for automated management of those tax-advantaged accounts. As described herein, account holders can communicate with account holder systems to tax-advantaged account management systems to manage various aspects of tax-advantaged accounts, such as health savings accounts and other accounts.

The disclosed systems and methods for automated management of tax-advantaged accounts provide a number of advantages of prior solutions. For example, the disclosed embodiments provide for unification of disparate sources of qualifying expense data, with sources including account activity from the custodian, manual entry by account holder, and automated feeds from other payment vehicles (e.g., credit cards). In addition, other sources of expense data can also be utilized. For example, explanation of benefits (EOBs) from insurance companies may also be a source of expense data that can be processed automatically by the disclosed systems and methods. The disclosed embodiments also provide for automated qualification of expenses from payment vehicles outside of the tax-advantaged account (e.g., credit cards) based on the various aspects of the transaction and user preferences. Still further, the disclosed embodiments provide for constant tracking of the account holder's amount eligible for reimbursement based on lifetime expenses and withdrawals. In addition, the disclosed embodiments provide for automated or manual initiation of retrospective reimbursement activity constrained by user preferences, amount eligible for withdrawal, and amount available for withdrawal. The disclosed embodiments can also make use of simultaneous offsetting ACH transactions into and out of an HSA, if desired. Still further, the disclosed embodiments provide for iterative communication and work flow between the account holder and a third party tasked with substantiation. The systems and methods disclosed herein may also provide numerous other advantages as compared to prior solutions.

The disclosed systems and methods are also useful in a variety of different user situations or primary use cases where prior solutions make it extremely difficult for account holders to determine appropriate reimbursements from their tax-advantaged accounts. For example, one use case includes a saver who is spending outside of the account. Another use case includes a low balance spender who is using both the HSA account and outside payment vehicles to purchase goods and services. A further use case includes a zero balance account holder who does all spending with outside payment vehicles and only diverts money through the account for favorable tax treatment. The systems and methods disclosed herein may also be advantageous for numerous other use cases as compared to prior solutions.

Certain terms are used below in describing example embodiments with respect to drawings. The following descriptions are provided for these terms. These descriptions are provided to help explain these terms as used in the descriptions below but are not to be taken as necessarily limiting the scope of the disclosed embodiments.

ACH—As used herein, the term ACH refers to a debit or credit to a financial account processed through the Automated Clearing House network.

Account holder—As used herein, the term account holder refers to the individual owning or controlling the assets held in a financial account or the beneficiary of a financial arrangement.

Community sentiment—As used herein, the term community sentiment refers to the aggregate number or portion of other system users' designations in the system regarding whether or not a particular transaction is a qualifying expense, whether or not a particular supplier sells goods or services which count as qualifying expenses, whether a qualifying supplier only sells goods and services which count as qualifying expenses, and other relevant designations and preferences.

Custodian—As used herein, the term custodian refers to the financial institution holding the assets in a limited-purpose tax-advantaged account or the administrator of a financial arrangement, as applicable.

Limited-purpose tax-advantaged account—As used herein, the term limited-purpose tax-advantaged account refers to a financial account or arrangement which confers tax benefits on money designated for specific expenditures such as education or health care. Tax benefits may include payroll and/or income tax-free contributions, tax-free growth, and/or tax-free withdrawals.

Merchant category code—As used herein, the term merchant category code refers to a numerical code associated with a card transaction which purports to identify the industry classification of the merchant of goods or services purchased.

Prospective reimbursement—As used herein, the term prospective reimbursement refers to a method for making withdrawals from limited-purpose tax-advantaged accounts whereby the custodian disburses funds in a lump-sum to another account rather than directly to a qualifying supplier.

Qualifying expense—As used herein, the term qualifying expense refers to an expenditure for goods or services for the benefit of an account holder or other authorized beneficiary which meets the guidelines specified by the Internal Revenue Service and other authorities for payment from a particular type of limited-purpose tax-advantaged account. For example, many educational expenses are qualifying expenses for Coverdell Education Savings Accounts and 529 Plans and many medical expenses are qualifying expenses for Health Savings Accounts, Medical Savings Accounts, Flexible Spending Arrangements, and Health Spending Arrangements. Qualifying expenses may be entered into the system manually, by designation by the account holder of a transaction as a qualifying expense, or automatically by the system in response to previously undertaken actions or preferences set by the account holder.

Qualifying withdrawal—As used herein, the term qualifying withdrawal refers to money removed from a limited-purpose tax-advantaged account which conforms to account usage guidelines specified by the Internal Revenue Service and other authorities, and is not subject to a tax penalty. A qualifying withdrawal may take the form of a direct payment to a qualifying supplier for a qualifying expense or portion thereof, prospective or retrospective reimbursement to the account holder or other authorized beneficiary for a qualifying expense or portion thereof, or a fee levied directly by the account custodian.

Reimbursable amount—As used herein, the term reimbursable amount refers to qualifying expenses made outside of a limited-purpose tax-advantaged account and not yet reimbursed through a qualifying withdrawal.

Retrospective reimbursement—As used herein, the term retrospective reimbursement refers to a method for making withdrawals from limited-purpose tax-advantaged accounts whereby the account holder pays for qualifying expenses from a different account, and then reimburses that account or otherwise makes a corresponding qualifying withdrawal from the limited-purpose tax-advantaged account.

Third party reviewer—As used herein, the term third party reviewer refers to an independent administrator who evaluates whether expenditures are or are not qualifying expenses from a particular limited-purpose tax-advantaged account.

Transaction—As used herein, the term transaction refers to the electronic report of an expenditure received directly by the system from either a custodian or other financial institution which an account holder uses to make payments. The account holder may designate a transaction as a qualifying or non-qualifying expense.

Withdrawal—As used herein, the term withdrawal refers to money removed from a limited-purpose tax-advantaged account by the account holder, whether qualifying or not, for payment of any expense or fee. The transfer of funds to another limited-purpose tax-advantaged account does not constitute a withdrawal by the account holder. A corrective adjustment to tax-advantaged contributions or qualifying withdrawals performed by the custodian and resulting in a reduced balance does not constitute a withdrawal by the account holder.

Now, embodiments for example systems and methods for automated management of tax-advantaged accounts are described with respect to the drawings.

FIG. 1A is a block diagram for an embodiment 150 for automated management of tax-advantaged accounts including account holder systems 152 and automated tax-advantaged account management systems 156. As depicted, account holders can utilize account holder systems 152 to communicate with automated tax-advantaged account management systems 156 to manage accounts and facilitate tax treatment for those accounts. The automated tax-advantaged account management systems 156 can be further configured to communicate with tax-advantaged account data and storage systems 154 to store data and information associated with the automated management of the tax-advantaged accounts. Further, the automated tax-advantaged account management systems 156 can be configured to communicate with financial custodian systems 158, payment source systems 160 and reviewer systems 162, as well, to facilitate the automated management of tax-advantaged accounts, as described herein.

It is noted that the computing systems described herein, such as account holder systems 152 and automated tax-advantaged account management systems 156, can take a wide variety of computing systems or groups of computing systems, including but not limited to personal desktop computers, portable computers, personal computing devices, server computer systems, and/or any other desired computing system and/or information processing systems. It is further noted that the systems described herein may include any devices or groups of devices operable to compute, process, communicate, store, display and/or utilize information or data for desired purposes. The systems may further include a variety of components including but not limited to memory devices such as random access memory (RAM) devices or read only memory (ROM) devices, processors such as central processing units (CPUs), controllers, and/or other circuitry, devices or processing units. Additional components may also be included as part of these systems, such as disk drives, network ports, various input and output (I/O) devices, and/or other desired components. Data storage devices and systems can also be utilized and may take a variety of forms, as desired, such as networked drives and mass storage systems or other storage devices that are configured to be utilized with the systems described herein to store data and information used in the management of tax-advantaged accounts. Still further, communications between the systems and devices described herein can occur through any of a variety of forms, including any desired wired and/or wireless communications through any number of networked systems, including systems configured to communicate through INTERNET connections. In addition, network browser applications, such as INTERNET browsers, can be utilized by the computing systems described herein to allow users and systems to communicate with each other over INTERNET connections and to view and take action concerning information and data related to tax-advantaged accounts.

Figure 1B:
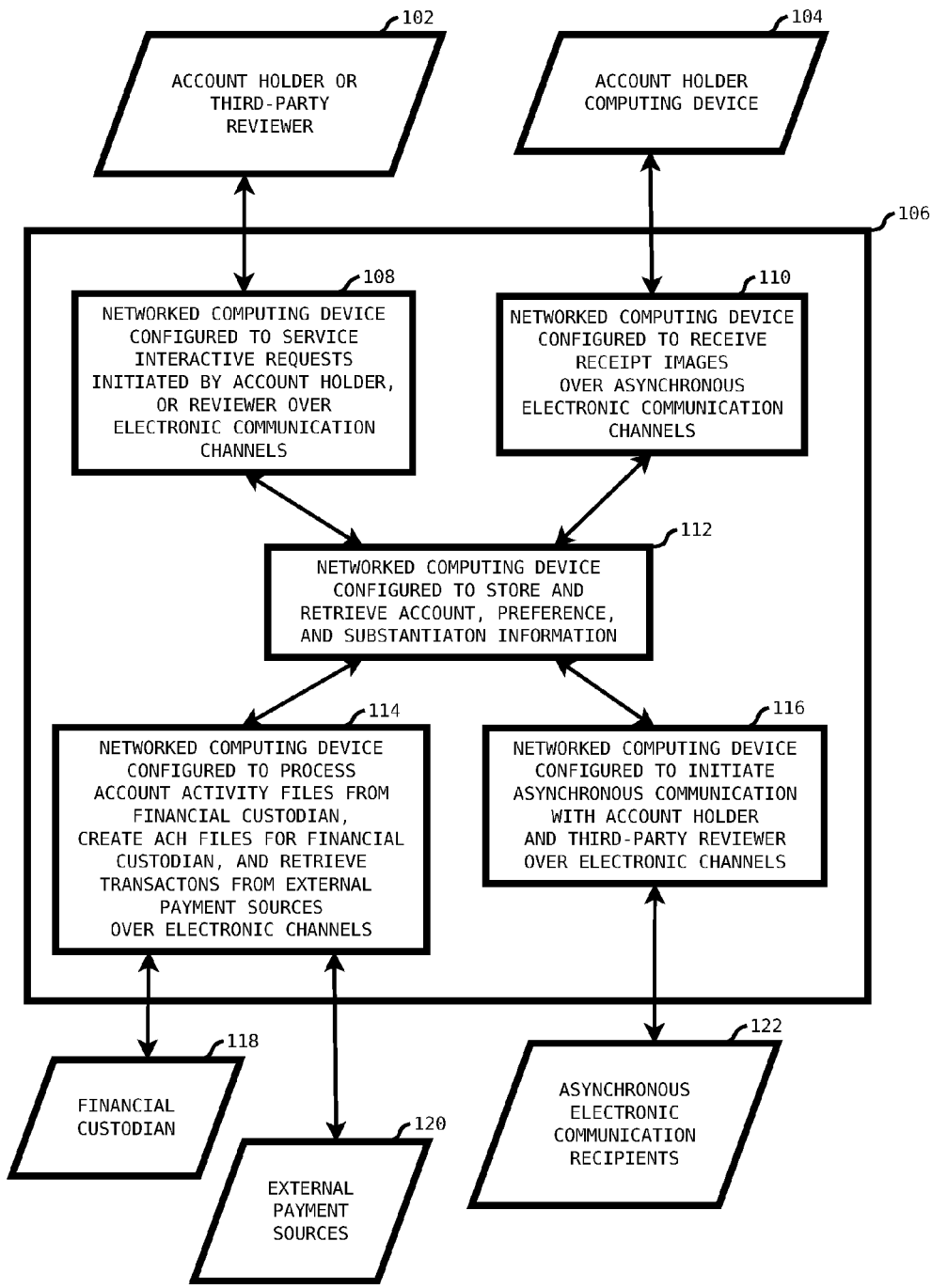
FIG. 1B is a block diagram of computing devices, network connections, and external interfaces for automated tax-advantaged account management.

FIG. 1B is a block diagram of the computing systems or devices, network connections, and external interfaces of a system 106 for management of tax-advantaged accounts. In the embodiment depicted, the system 106 comprises one or more networked computing devices 112 configured to store and retrieve account, preference, and substantiation information; one or more networked computing devices 108 configured to service interactive requests initiated by account holder or third party reviewer over electronic communication channels; one or more networked computing devices 110 configured to receive receipt images over asynchronous or other desired electronic communication channels; one or more networked computing devices 114 configured to process account activity files from a financial custodian, create ACH files for a financial custodian, and retrieve transactions from external payment sources over electronic channels; and one or more networked computing devices 116 configured to initiate communication with account holder or third party reviewer over electronic channels. In the depicted embodiment, account holders and/or third party reviewers 102 interact with a networked computing device 108 configured to service interactive requests via the INTERNET. Typical account holder interactions include, but are not limited to, setting of system preferences, manual entry of expenses, review of electronic transactions requiring account holder input to identify expenses, upload of receipt images, association of receipt images with expenses, requests for reimbursement, and response to inquiries of third party reviewers. Typical third party reviewer interactions include, but are not limited to, review of account holder provided expenses and receipt images and qualifying of those expenses if required by the authority governing the limited-purpose tax-advantaged account. In the depicted embodiment, account holder may also use a computing device 104, such as a camera-enabled wireless phone, to transmit receipt images to a networked computing device 110 configured to receive incoming receipt images over asynchronous or other desired electronic communication channels via one or more electronic messaging protocols such as EMAIL and MMS. In the depicted embodiment, the financial custodian 118 of the limited-purpose tax-advantaged account provides account activity information, such as balance, deposits, and withdrawals, to the system via a networked computing device 114 configured to process this information. In the depicted embodiment, a networked computing device 114 configured to retrieve transactions from external payment sources identified in account holder preferences periodically utilizes the preference information provided by account holders to retrieve transaction information from external payment sources 120, including but not limited to credit card web sites via the INTERNET. In the depicted embodiment, a networked computing device 116 is configured to initiate communication with electronic communication recipients 122, such as account holders and third party reviewers, via one or more electronic messaging protocols such as EMAIL and MMS.

Figure 2:
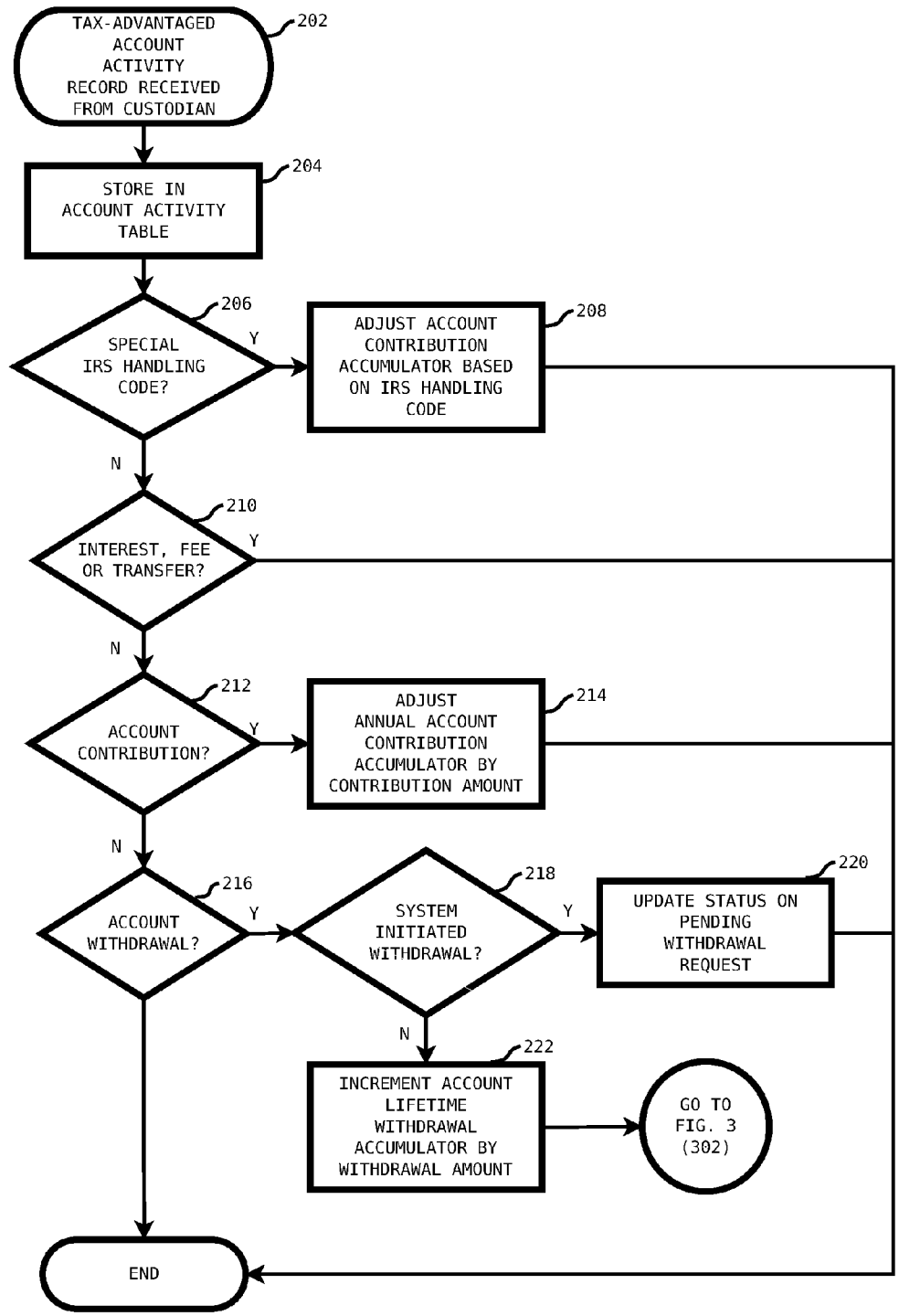
FIG. 2 is a flow diagram of processing an account activity record received from a tax-advantaged account's financial custodian.

FIG. 2 is a flow diagram of processing an account activity record received from a tax-advantaged account's financial custodian. Account activity processing starts in block 202 with the receipt of the information from the financial custodian. Each account activity record received from the custodian is immediately stored in the account activity table in block 204. A sample of account activity table data is shown in FIG. 10. If the account activity record is determined to contain a special Internal Revenue Service handling code in decision block 206, block 208 is reached where the record initiates a correction and the account contribution accumulator is adjusted accordingly. Otherwise, process flows to decision block 210. If the account activity record is identified by the custodian in decision block 210 as an interest payment, a custodial fee charged to the account, or a transfer to or from an investment account, then no further action is required. Otherwise, process flows to decision block 212. If the account activity record is identified by the custodian in decision block 212 as an account contribution, the account contribution accumulator is increased by the contribution amount in block 214. Otherwise, process flows to decision block 216. If the account activity record is identified by the custodian as a withdrawal in decision block 216, the withdrawal is further checked to determine if it is a system initiated withdrawal in decision block 218. If the withdrawal was a system initiated withdrawal, the corresponding pending withdrawal request is marked as complete in block 220. If the withdrawal was not a system initiated withdrawal, the account holder's lifetime withdrawal accumulator is incremented by the withdrawal amount in block 222, and the withdrawal is evaluated as an electronic transaction as described in FIG. 3.

Figure 3:
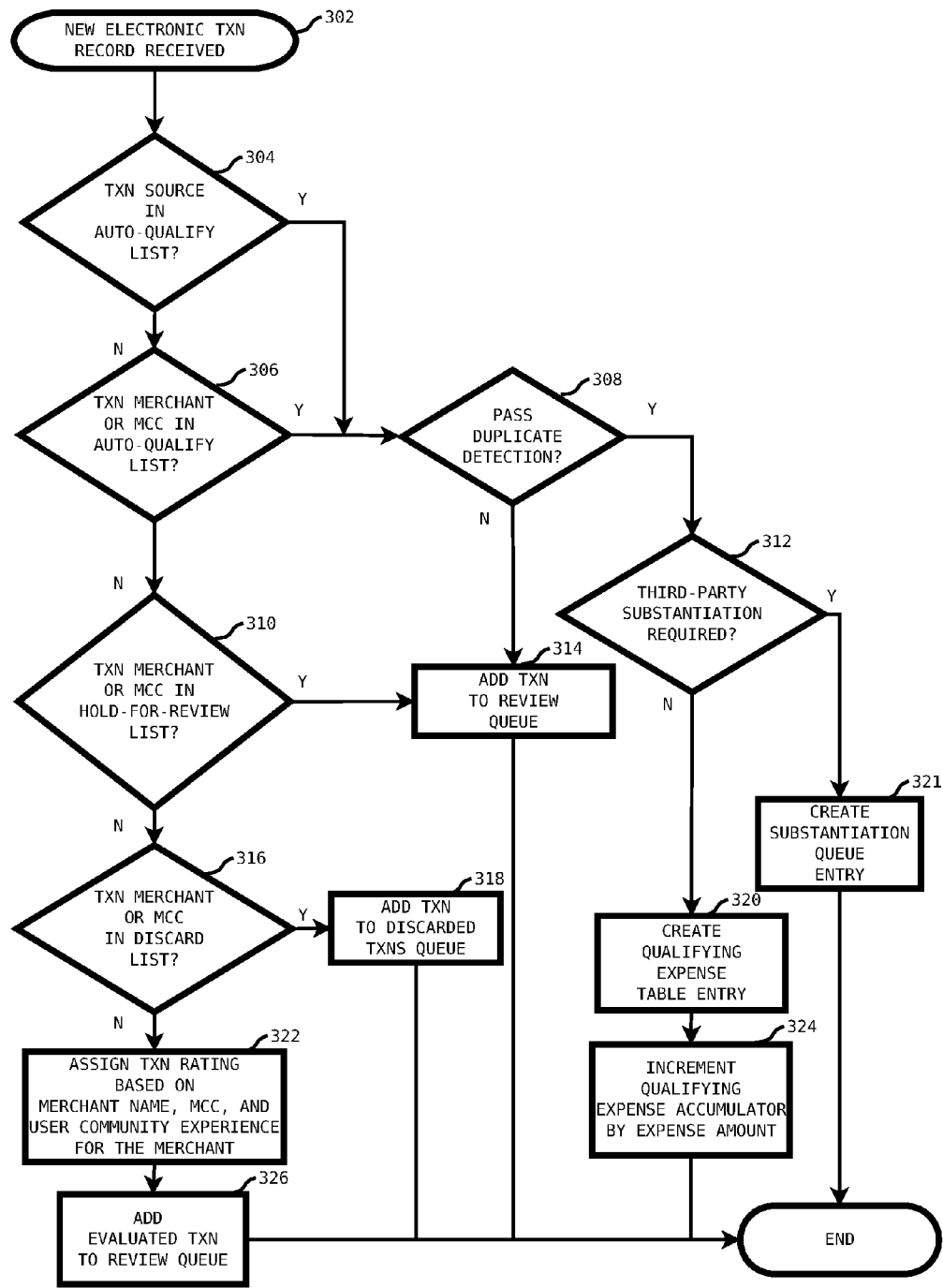
FIG. 3 is a flow diagram of the automated processing of an electronic transaction record.
Figure 4:
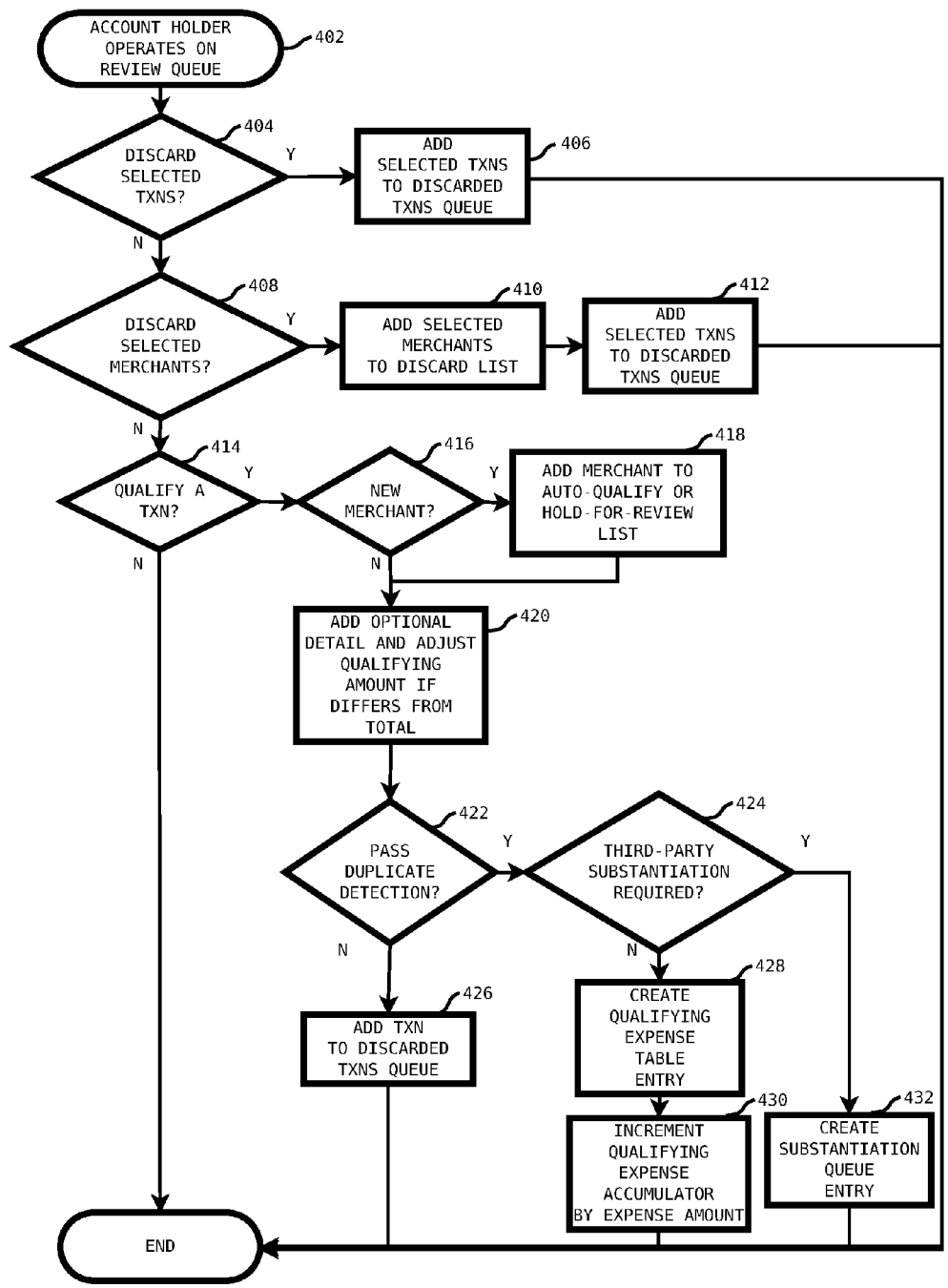
FIG. 4 is a flow diagram of the account holder interacting with the queue of electronic transaction records held for review.

FIG. 3 is a flow diagram of the automated processing of an electronic transaction record. In the depicted embodiment, automated processing of an electronic transaction record begins either from block 222 as a result of identifying a withdrawal from the limited-purpose tax-advantaged account which was not initiated by the system or when the transaction information is retrieved from an external payment source identified in an account holder's preferences. A sample of electronic transaction record data is shown in FIG. 9. In the depicted embodiment, an electronic transaction record is first evaluated in decision blocks 304 and 306 to determine if the payment source for the transaction (TXN) is identified in the account holder's preferences as being a source whose transactions are always qualifying expenses. As shown in FIG. 4, the account holder may also associate preferences with individual merchants such that future electronic transactions for those merchants may automatically be transformed into qualifying expenses, may automatically be discarded, or may be held for account holder review. Utilizing the account holder's preferences regarding disposition of transactions from certain payment sources and the account holders preferences regarding certain merchants, the disclosed embodiments identify electronic transaction records which may be automatically transformed into qualifying expenses in decision blocks 304 and 306, those electronic transaction records which are held for in a queue for account holder review in decision blocks 310, and those electronic transaction records which are to be discarded in decision block 316. In order to avoid the creation of duplicate expenses, the depicted embodiment compares the merchant, date, and amount of the electronic transaction record to existing expenses in decision block 308 prior to automatically creating an expense and diverts the electronic transaction record to the queue requiring account holder review in block 314 in lieu of creating an expense. In the case of limited-purpose tax-advantaged accounts where third party review of qualifying expenses is determined in decision block 312, electronic transaction records which are candidates to become qualifying expenses are added to the account holder's substantiation queue in block 321. A sample of substantiation work queue data is shown in FIG. 12. In the case of limited-purpose tax-advantaged account where third party substantiation of qualifying expenses is not required, an electronic transaction record which meets account holder preference criteria for automatic qualification results in the creation of a qualifying expense in block 320 and in the account holder's qualifying expense accumulator being incremented by the amount of the qualifying expense in block 324. All of an account holder's qualifying expenses are maintained in a qualifying expense table for future reference and edits. A sample of qualifying expense table entries is shown in FIG. 11. Prior to adding new merchants to the queue for account holder review in block 326, the embodiment may utilize in block 322 aspects of the electronic transaction record such as keywords in the merchant name, merchant category code, and community sentiment to add a qualification rating to aid the account holder in determining whether the electronic transaction record represents a qualifying expense.

FIG. 4 is a flow diagram of the account holder interacting with the queue of electronic transaction records held for review. In the depicted embodiment, the automated processing of electronic transaction records, as shown in FIG. 3, may result in certain electronic transaction records being held in a queue for account holder review. The account holder reviewing the electronic transaction records held in this queue may choose to discard one or more electronic transaction records in decision block 404, discard all current and future electronic transaction records from one or more merchants in decision block 408, or transform an electronic transaction record into a qualifying expense in block decision 414. If the account holder chooses to discard one or more electronic transaction records in decision block 404, those electronic transaction records are removed from the review queue and added to a queue of discarded electronic transaction records in block 406. If the account holder chooses to discard the merchants for one or more electronic transaction records in decision block 408, the merchants for those electronic transaction records are added to the account holder's discard list in block 410, which will result in future electronic transaction records from those merchants being automatically discarded in block 316, and all electronic transaction records in the review queue from those merchants are removed from the review queue and added to a queue of discarded electronic transaction records in block 412. If the account holder chooses to transform an electronic transaction record into a qualifying expense in decision block 414, the account holder may provide additional information about the qualifying expense and about the merchant. If the account holder has not previously recorded a preference for the merchant of the electronic transaction record being transformed into a qualifying expense in decision block 416, the account holder may designate that future electronic transaction records from this merchant should automatically be transformed into qualifying expenses or that future transactions from this merchant should be diverted to the review queue in block 418. This preference will result in future electronic transactions from this merchant either being automatically transformed into qualifying expenses in block 306 or being automatically diverted to the review queue in block 314. The account holder may add optional detail to the qualifying expense created from the electronic transaction record, including but not limited to adding comments, adding tags, and adjusting the qualifying amount of the expense if it differs from the total of the electronic transaction record in block 420. In order to avoid the creation of duplicate expenses, the embodiment compares the newly created qualifying expense to existing expenses in decision block 422 and allows the account holder to discard the electronic transaction record and qualifying expense in block 426 if a duplicate is found. In the case of limited-purpose tax-advantaged accounts where third party review of qualifying expenses is required in decision block 424, a qualifying expense candidate is added to the account holder's substantiation queue in block 432. A sample of substantiation work queue data is shown in FIG. 12. In the case of limited-purpose tax-advantaged account where third party substantiation of qualifying expenses is not required in decision block 424, the qualifying expense is added to the account holder's qualifying expense table in block 428 and the account holder's qualifying expense accumulator is incremented by the amount of the qualifying expense in block 430.

Figure 5:
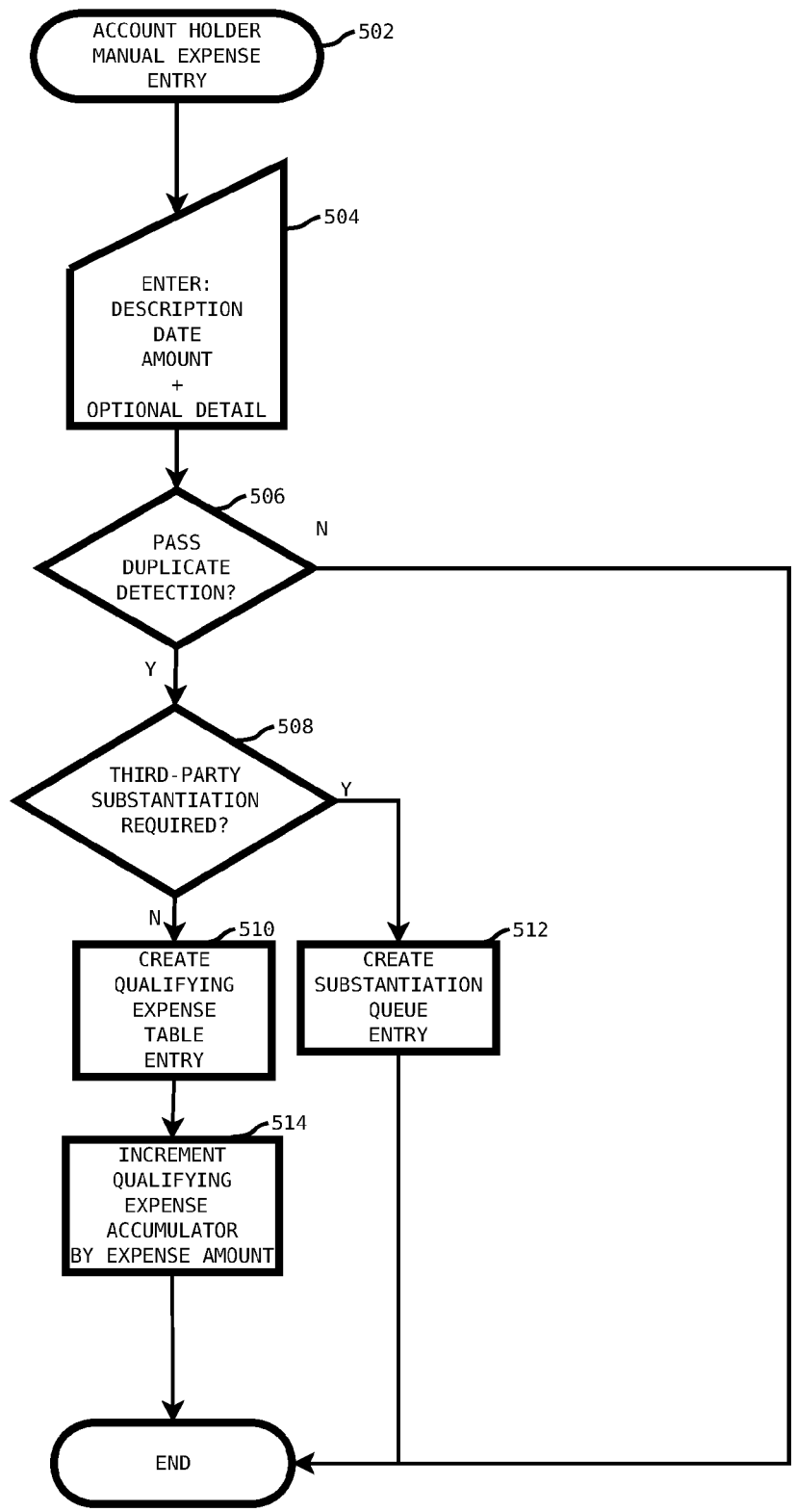
FIG. 5 is a flow diagram of account holder work flow for entering an expense manually.

FIG. 5 is a flow diagram of account holder work flow for entering an expense manually. In the depicted embodiment, the account holder may manually create an expense by providing the date, a description, and the amount of the expense in block 504. In order to avoid the creation of duplicate expenses, the embodiment compares the newly created qualifying expense to existing expenses in decision block 506 and allows the account holder to discard the manually entered expense if a duplicate is found. In the case of limited-purpose tax-advantaged accounts where third party substantiation is required in decision block 508, a qualifying expense candidate is added to the account holder's substantiation queue in block 512. A sample of substantiation work queue data is shown in FIG. 12. In the case of limited-purpose tax-advantaged account where third party substantiation is not required in decision block 508, the qualifying expense is added to the account holder's qualifying expense table in block 510 and the account holder's qualifying expense accumulator is incremented by the amount of the qualifying expense in block 514.

Figure 6:
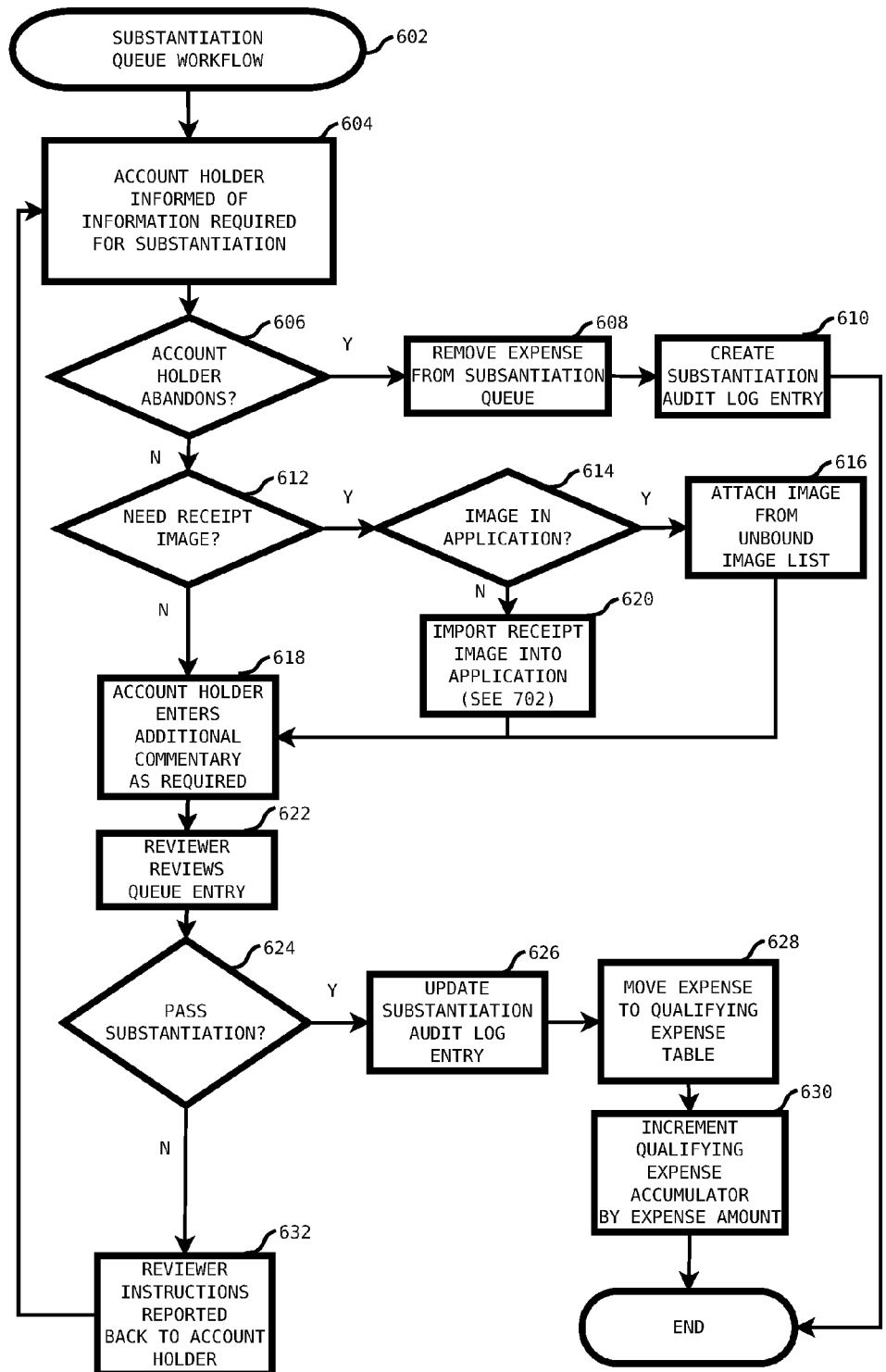
FIG. 6 is a flow diagram of substantiation work flow for third party review.

FIG. 6 is a flow diagram of substantiation work flow for third party review. In the depicted embodiment, in the case of limited-purpose tax-advantaged accounts where third party review of substantiating information for qualifying expenses is required, qualifying expense candidates are added to the account holder's substantiation work queue as shown in FIG. 4 and FIG. 5. A sample of substantiation work queue data is shown in FIG. 12. Each substantiation work queue entry 1204 identifies comments and receipt images associated with qualifying expense candidates 1202. The third party reviewer examines the substantiation work queue entry 1202 and the associated supporting information in block 622. If the third party reviewer approves the qualifying expense candidate in decision block 624, the approval is recorded in the substantiation audit log in block 626, the qualifying expense is moved from the substantiation work queue to the account holder's qualifying expense table in block 628, and the account holder's qualifying expense accumulator is incremented by the amount of the qualifying expense in block 630. A sample of substantiation audit log data is shown in FIG. 13. If the third party reviewer does not approve the qualifying expense candidate in decision block 624, the third party reviewer indicates the additional information required for substantiation in block 632, which are reported back to the account holder via an electronic communication channel, such as EMAIL. Based on feedback from the third party reviewer, the account holder may choose to abandon the substantiation process in decision block 606, which will remove the expense from the substantiation work queue, and create a substantiation audit log entry in blocks 608 and 610. Alternatively, if the account holder decides not to abandon the substantiation process in decision block 606, decision block 612 is reached where the account holder can decide to provide receipt image information. If an image is to be attached, decision block 614 is reached where a determination is made whether the image is already in the application. If it is, the block 616 is reached where an image can be attached from an unbound image list. If it is not, block 620 is reached where a receipt image can be imported as shown in block 702. In block 618, the account holder may provide additional commentary without or along with receipt images to address the feedback from the third party reviewer, initiating another review cycle in decision block 624. Multiple iterations of this review cycle may be required before the requirements third party reviewer are satisfied or the account holder abandons the expense.

Figure 7:
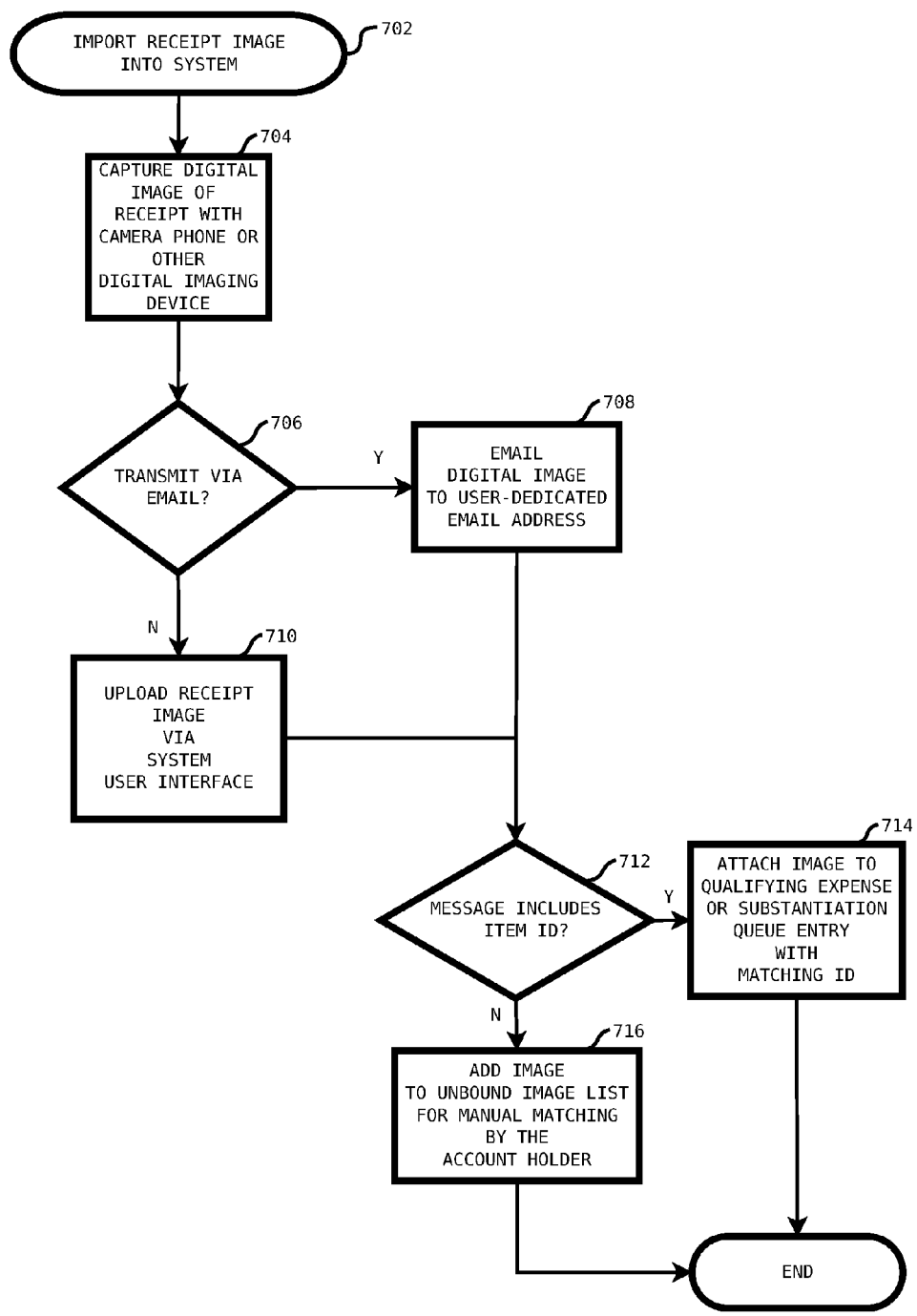
FIG. 7 is a flow diagram of receipt image import and attachment.

FIG. 7 is a flow diagram of receipt image import and attachment. In block 704, the account holder may receive a digital receipt image from the merchant or the account holder may capture a digital receipt image with a device such as a camera phone, computer scanner, or digital camera. In the depicted embodiment, the account holder determines in decision block 706 whether or not to provide the digital image by EMAIL. If by EMAIL, then block 708 is reached where the electronic receipt image is sent by EMAIL or by some other desired communication channel. If not by EMAIL, then block 710 is reached where the electronic receipt image is provided via direct electronic communication over the INTERNET. If the receipt image contains identifier information such as a numeric identifier (ID) or a bar code in decision block 712, the image may be automatically attached to a qualifying expense or substantiation work queue entry with a matching identifier in block 714. Images which do not contain identifying information sufficient to be automatically matched to a qualifying expense or substantiation work queue entry in decision block 712 are added to an unbound image list in block 716 for manual matching by the account holder. It is further noted that receipt images or other electronic image data can be processed using OCR (object character recognition) or other digital processing to determine relevant information from the image data, such as information or identifiers related to the transaction covered by the image data.

Figure 8:
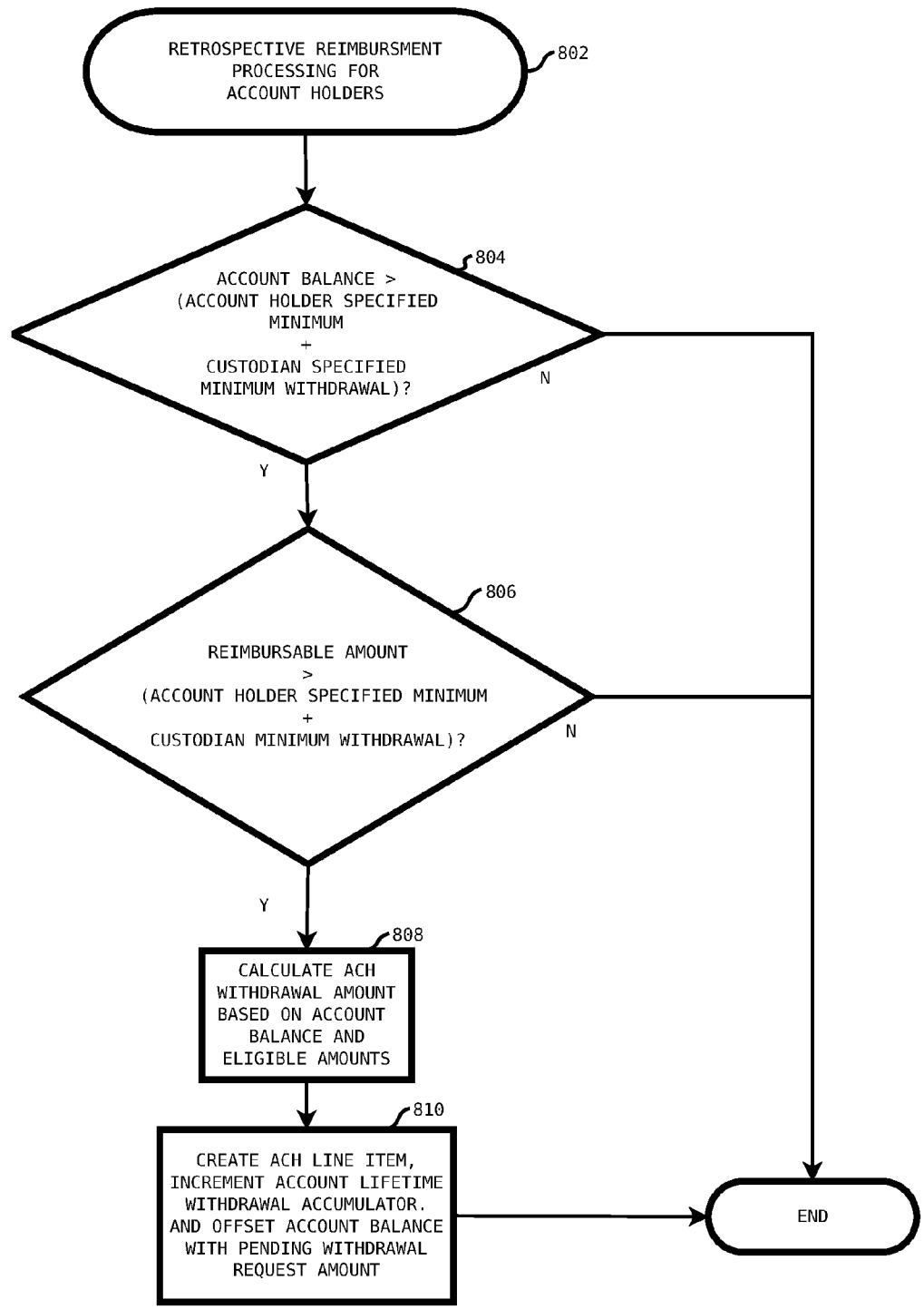
FIG. 8 is a flow diagram of retrospective reimbursement processing for account holders.

FIG. 8 is a flow diagram of retrospective reimbursement processing for account holders. In the depicted embodiment, based on the account holder's preferences, the system may initiate processing of qualifying withdrawals for retrospective reimbursement in block 802. Retrospective reimbursement amounts are calculated based on account holder preferences, custodian minimum withdrawal amounts, reimbursable amounts and/or other factors. If the balance of the limited-purpose tax-advantaged account exceeds the sum of the account holder specified minimum balance and the custodian's minimum withdrawal amount, a determination is made in decision block 804 that sufficient available funds exists to consider retrospective reimbursement. The difference between the qualifying expense accumulator and the account lifetime withdrawal accumulator is the reimbursable amount. If the reimbursable amount is determined in decision block 806 to exceed the account holder's preferred minimum balance by at least the custodian's minimum withdrawal amount, the qualifying withdrawal amount is calculated in block 808 as the minimum of the reimbursable amount and the difference between the account balance and the account holder specified minimum balance. Next, in block 810, an ACH line item for the qualifying withdrawal amount is created and submitted to the custodian via an electronic communication channel such as the INTERNET, the account holder's lifetime withdrawal accumulator is incremented by the qualifying withdrawal amount, and the account balance is offset by the amount of the pending qualifying withdrawal. The account holder may also request retrospective reimbursements manually following the same work flow in FIG. 8. In the case of manual retrospective reimbursement the account holder specified minimum balance does not apply to any of the calculations above. When system initiated retrospective reimbursements are detected in subsequent account activity records the pending reimbursement status is updated in block 220.

By virtue of the mechanisms in FIG. 3 and FIG. 8 and in accordance with account holder preferences, electronic transaction records from external payment sources which are transformed into qualifying expenses may be further transformed into automated retrospective reimbursements. Additionally, future deposits into limited-purpose tax-advantaged accounts whose qualifying expense accumulator exceeds the lifetime withdrawal accumulator may also be transformed into automated retrospective reimbursements, in accordance with account holder preferences. Further, account holder preferences may be configured to notify the account holder of reimbursable amounts via either periodic or asynchronous EMAIL communications. Utilizing these mechanisms the depicted embodiments allow any combination of notification of reimbursable amounts and automated retrospective reimbursement desired by the account holder.

If desired, additional embodiments can be implemented by substituting annual accumulators for the qualifying expense accumulator and lifetime withdrawal accumulator described above for the purposes of limiting qualifying withdrawals for the purpose of retrospective reimbursement to the tax year in which qualifying expenses were incurred.

It is noted that FIGS. 9-13 provide example embodiments for transaction records, account activity, qualifying expense entries, substantiation work entries, and substantiation audit logs as described above. More particularly, FIG. 9 is a sample table of transaction data records received from multiple data sources that includes a transaction reference identifier (TXN REFID), a transaction source (TXN SOURCE), a date (DATE), a merchant (MERCHANT), an amount (AMOUNT), a merchant category classification (MCC) code, and a card issuer transaction number (CARD ISSUER TXN#). FIG. 10 is a sample table of tax-advantaged account activity received from a financial custodian that includes a internal reference number (INT REF#), a transaction type (TXN TYPE), a date (DATE), a description or memo field (MEMO), an amount (AMOUNT), an IRS code (IRS CODE), and a custodian reference number (CUSTODIAN REF #). FIG. 11 is a sample table of expenses associated with a tax-advantaged account that includes a unique identifier (UNIQUE ID), a transaction source (TXN SOURCE), a transaction reference identifier (TXN REFID), a date (DATE), a merchant (MERCHANT), an amount (AMOUNT), a merchant category classification (MCC) code, associated images and comments (IMAGES/CONTENTS), and a substantiation audit log number (if required) (SUBSTANTIATION AUDIT LOG). FIG. 12 is a sample table of substantiation work queue items that includes a unique identifier (UNIQUE ID) 1204, a transaction source (TXN SOURCE), a transaction reference identifier (TXN REFID), a date (DATE), a merchant (MERCHANT), an amount (AMOUNT), a merchant category classification (MCC) code, and associated images and comments (IMAGES/CONTENTS) 1202. FIG. 13 is a sample of a substantiation audit log that includes an entry identifier (ENTRY ID), a unique identifier (UNIQUE ID), a reviewer identifier (REVIEWER ID), substantiation disposition information (SUBSTANTIATION DISPOSITION), substantiation date (SUBSTANTIATION DATE, and related supporting information (SUPPORTING INFO).

It is noted that FIGS. 9-13 provide example embodiments and should not be considered as limiting the disclosed embodiments. It is further noted that the information set forth in these example embodiments could be provided through a variety of mechanisms to users of the systems and methods described herein. For example, this information could be provided through network browser applications, such as INTERNET browsers, through which users can take a variety of actions as described above including viewing information, reviewing information, approving items, disapproving items, selecting items, entering data or information, responding to inquiries and/or any other desired action associated with the systems and methods described herein. Using these network-based applications for communicating data, information, control and commands among the computing and storage systems described herein helps to facilitate the automated management of tax-advantaged accounts and the data and information associated with these tax-advantaged accounts in an efficient manner.

Figure 14:
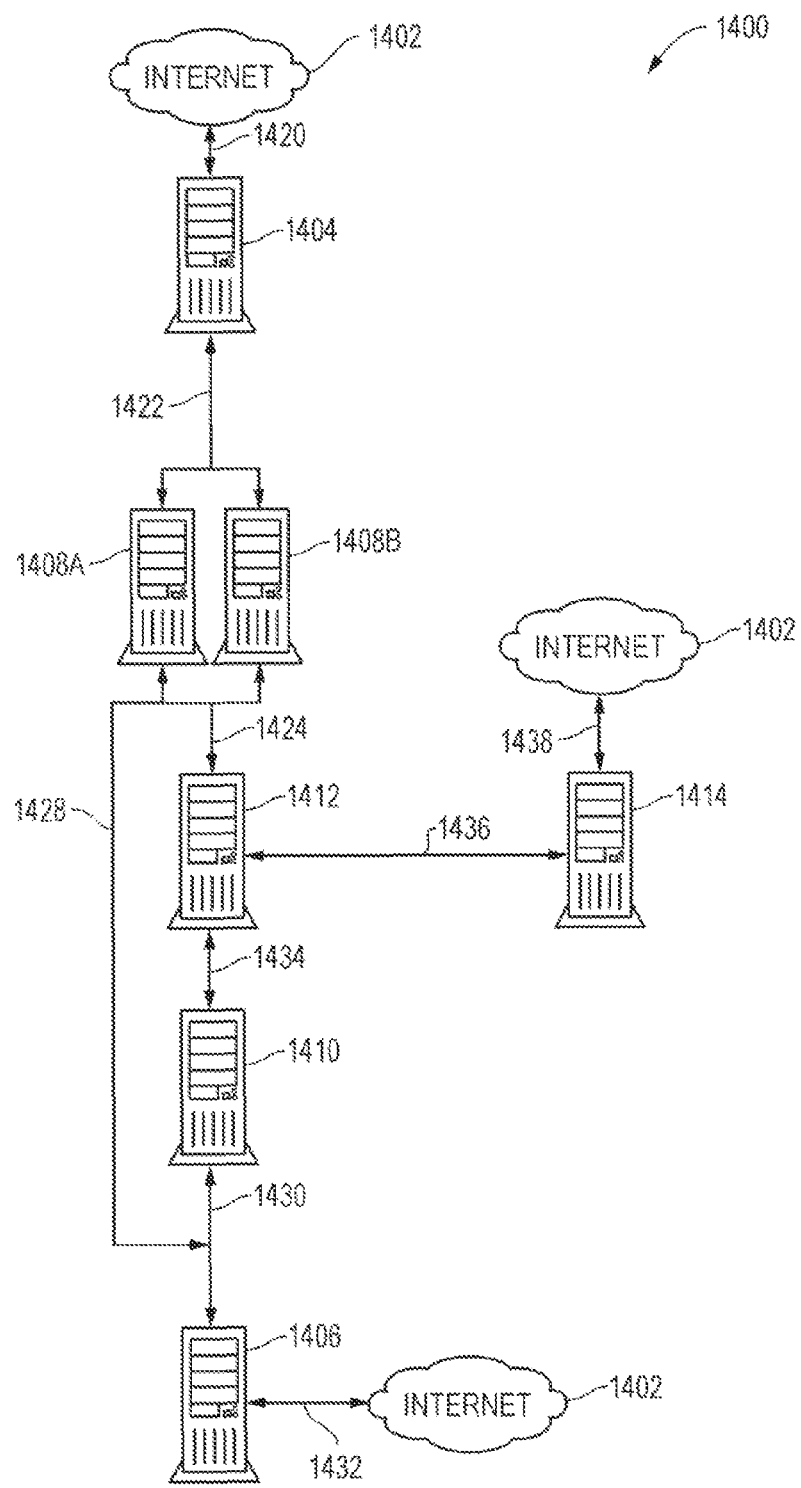
FIG. 14 is a block diagram of computing devices, network connections, and external interfaces for automated tax-advantaged account management.

FIG. 14 is a block diagram of computing devices, network connections, and external interfaces for automated tax-advantaged account management. As described above, one or more server systems can be used to manage and process data associated with tax-advantaged accounts. As depicted in embodiment 1400, one or more application server systems 1408A/B are coupled to the Internet 1402 through one or more secure user access server systems 1404 and to the Internet 1402 through one or more secure financial access server systems 1406. One or more scheduled operation servers 1410 are coupled to the Internet 1402 through one or more secure financial access server systems 1406. The application server systems 1408A/B and the schedule operations server systems 1410 are coupled to each other and to one or more database server systems 1412. One or more receipt server systems 1414 can also be coupled to the database server systems 1412 and can be configured to receive receipts through email communications through the Internet 1402.

In operation, the secure user access server systems 1404 can be configured to communicate with account holders or users through the Internet 1402 and to distribute multiple inbound access sessions to the application server systems 1408A/B. The application server systems 1408A/B can be configured to provide user interfaces to account holder sessions, to provide operational logic for user initiated actions, to request import of financial transactions from user registered sources through the secure financial access server systems 1406, to identify and generate qualifying expenses (e.g., based on user specified automation rules, merchant information, and community sentiment as described above), to initiate automated reimbursements (e.g., based on available balance, unreimbursed expenses, and user preferences as described above), and/or to access and store data through communications with the database server systems 1412. The database server systems 1412 can be configured to respond to data access and storage requests from the other systems. The scheduled operations server systems 1410 can be configured to import periodic account data feed batch files provided by financial institutions, to trigger email reminders for account holders, to request periodic import of financial transactions from user registered sources through the secure financial access server systems 1406, to identify and generate qualifying expenses (e.g., based on user specified automation rules, merchant information, and community sentiment as described above), to initiate automated reimbursement (e.g., based on available balance, unreimbursed expenses, and user preferences as described above), to generate ACH files for reimbursing account holders, and to access and store data through communications with the database server systems 1412. The secure financial access server systems 1406 can be configured to respond to financial transaction import requests from the other server systems by initiating connections with external custodian server systems (e.g., using credentials and protocols for those systems), to store account holder credentials for accessing remote accounts, and to store access information and protocols for various remote sources of account holder financial transactions (TXNs). The receipt server systems can be configured to receive receipt images from account holders (e.g., via dedicated email addresses) and to access and store data through communications with the database server systems 1412.

Various protocols can be used to communicate between the various systems, as described above, including HTTPS (hypertext transport protocol secure) protocols, HTTP (hypertext transport protocol) over SSL (secure socket layer) tunnel protocols, Java remote method invocation (RMI) over SSL links, database protocols over SSL links, remote access protocols over HTTPS, SMTP (simple mail transfer protocol) messages and/or other communication protocols. For example, an HTTPS protocol can be used for networked communications 1420 through the Internet 1402 between account holders or users and the secure user access server systems 1404, which can act as a DMZ (demilitarized zone) server. An HTTP protocol over an SSL tunnel can be used for networked communications 1422. Database protocols over SSL links can be used for networked communications 1424, 1434 and 1436 with the database server systems 1412. Java RMI over SSL links can be used for networked communications 1428 and 1430 with the secure financial access server 1406, which can act as a proxy server, and between the application server systems 1408A/B and the schedule operations server systems 1410. Remote access protocols over HTTPS can be used for networked communications 1432. SMTP email messages, for example received through the Internet 1402, can be used to receive receipts images through networked communications 1438. Other communication protocols and techniques could also be utilized as desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system for automated identification and processing of qualifying expenses for a tax-advantaged account, comprising:

a data storage system configured to store account activity data for a tax-advantaged account, to store transaction data associated with a plurality of expenses to be processed, and to store qualifying expense data for a plurality of qualifying expenses associated with the tax-advantaged account, wherein the transaction data includes a transaction source identifier and a merchant identifier for each expense to be processed, and wherein the qualifying expense data includes a transaction source identifier and a merchant identifier associated with each qualifying expense;

an interface computing system coupled to an external electronic channel and to the data storage system, the interface computing system configured to allow a user to access the account activity data, the transaction data and the qualifying expense data; and a networked computing system coupled to an external electronic channel and to the data storage system, the networked computing system being configured to receive transaction data associated with a plurality of expenses from a plurality of different external payment sources through the external electronic channel, to process the transaction data to obtain the transaction source identifier and the merchant identifier for each expense to be processed, to identify one or more qualifying expenses from the expenses to be processed, and to communicate with the data storage system to store the qualifying expense data for each qualifying expense;

wherein the plurality of different external payment sources are different from the tax-advantaged account;

wherein the transaction data from the plurality of external payment sources represents data from transactions where the external payment sources were used to make payment for the plurality of expenses;

wherein the networked computing system is further configured to generate electronic payment instructions for a reimbursement transaction and to communicate the electronic payment instructions to a computing system, the reimbursement transaction representing a withdrawal from the tax-advantaged account by an account holder, and the electronic payment instructions being configured to cause the reimbursement transaction to occur; and wherein the data storage system is further configured to store data associated with user reimbursement preferences, wherein the interface computing system is configured to allow a user to modify the user reimbursement preferences, wherein the networked computing system is configured to utilize the user reimbursement preferences to determine an amount for the reimbursement transaction, and wherein the networked computing system is further configured to initiate the withdrawal from the tax-advantaged account at any future time when criteria based upon the user reimbursement preferences are met.

2. The system of claim 1, wherein interface computing system is configured to allow a user to submit a reimbursement request, and wherein the networked computing system is further configured to generate the electronic payment instructions based upon the reimbursement request.

3. The system of claim 1, wherein the data storage system is configured to store qualifying expense accumulator data representing accumulated qualifying expenses associated with the tax-advantaged account and withdrawal accumulator data representing accumulated withdrawals associated with the tax-advantaged account, and wherein the networked computing system is further configured to determine an available reimbursable amount based upon a difference between the qualifying expense accumulator data and the withdrawal accumulator data.

4. The system of claim 3, wherein the qualifying expense accumulator data and the withdrawal accumulator data represent lifetime amounts.

5. The system of claim 3, wherein the qualifying expense accumulator data and the withdrawal accumulator data represent annual amounts.

6. The system of claim 1, wherein the user reimbursement preferences comprise a minimum account balance to maintain in the tax-advantaged account with respect to the reimbursement transaction.

7. The system of 1, wherein the data storage system is further configured to store data associated with account reimbursement requirements and wherein the networked computing system is further configured to utilize the account reimbursement requirements to automatically initiate a reimbursement transaction.

8. The system of claim 7, wherein the account reimbursement requirements comprise a minimum withdrawal amount.

9. The system of claim 1, wherein the networked computing system is further configured to generate electronic payment instructions for a contribution transaction from an external payment source to the tax-advantaged account and to communicate the electronic payment instructions to the external payment source.

10. The system of claim 9, wherein the data storage system is further configured to store data associated with user contribution preferences, wherein the interface communication system is configured to allow a user to modify the user contribution preferences, and wherein the networked computing system is configured to utilize the user contribution preferences to automatically initiate a contribution transaction.

11. The system of claim 1, wherein the networked computing system is further configured to initiate a contribution transaction based upon identification of one or more qualifying expenses within the transaction data.

12. The system of claim 11, wherein the contribution transaction is associated with payroll contribution from an employer.

13. The system of claim 1, wherein the data storage system is further configured to store a transaction review list including transaction data associated with a plurality of expenses, wherein the interface computing system is configured to allow a user to access the transaction review list and to make user selections of expenses to be treated as qualifying expenses, and wherein the networked computing system is configured to utilize the user selections to identify qualifying expenses.

14. The system of claim 13, wherein the networked computing system is further configured to generate ratings for expenses within the transaction review list, the ratings representing likelihood of expenses being qualifying expenses, wherein the data storage system is further configured to store the ratings with respect to the transaction review list, and wherein the interface computing system is further configured to allow a user to access the ratings as part of the transaction review list.

15. The system of claim 14, wherein the ratings are at least in part based upon community sentiment data representing treatment of similar expenses by a plurality of users.

16. The system of claim 13, wherein the data storage system is further configured to store merchant hold-for-review data, wherein the interface computing system is configured to allow a user to modify the merchant hold-for-review data, and wherein the networked computing system is configured to utilize the merchant hold-for-review data to add expenses to the transaction review list.

17. The system of claim 13, wherein the data storage system is further configured to store merchant discard data, wherein the interface computing system is configured to allow a user to modify the merchant discard data, and wherein the networked computing system is configured to utilize the merchant discard data to discard expenses within the transaction data so that the expenses discarded are not included in the transaction review list.

18. The system of claim 1, wherein the data storage system is further configured to store expense auto-qualification data, and wherein the networked computing system is further configured to compare the transaction data to the expense auto-qualification data to automatically identify qualifying expenses.

19. The system of claim 18, wherein the expense auto-qualification data includes one or more auto-qualified transaction source identifiers, one or more auto-qualified merchant identifiers, or both one or more auto-qualified transaction source identifiers and one or more auto-qualified merchant identifiers.

20. The system of claim 18, wherein the interface computing system is configured to allow a user to modify the expense auto-qualification data.

21. The system of claim 1, wherein the networked computing system is further configured to receive account activity records through an external electronic channel from a computing system associated with the tax-advantaged account, the account activity records representing a plurality of account transactions associated with the tax-advantaged account.

22. The system of claim 21, wherein the networked computing system is further configured to analyze the account activity records to determine account contribution transactions within the plurality of account transactions.

23. The system of claim 22, wherein the data storage system is further configured to store annual account contribution data for the tax-advantaged account and wherein the networked computing system is further configured to adjust the annual account contribution data based upon the contribution transactions determined from the account activity records.

24. The system of claim 21, wherein the networked computing system is further configured to analyze the account activity records to determine account withdrawal transactions within the plurality of account transactions.

25. The system of claim 24, wherein the data storage system is further configured to store account withdrawal data for the tax-advantaged account and wherein the networked computing system is further configured to adjust the account withdrawal data based upon the withdrawal transactions determined from the account activity records.

26. The system of claim 1, wherein the transaction data comprises transaction data associated with one or more financial accounts received through an external electronic channel.

27. The system of claim 26, wherein the one or more financial accounts comprise accounts associated with one or more credit cards.

28. The system of claim 26, wherein the one or more financial accounts comprise accounts associated with one or more debit cards.

29. The system of claim 1, wherein the transaction data comprises transaction data entered by a user, wherein the interface computing system is configured to allow a user to enter transaction data, and wherein the networked computing system is further configured to treat the transaction data entered by a user as a qualifying expense.

30. The system of claim 1, wherein the networked computing system is further configured to compare a qualifying expense with the account activity data to determine if a duplicate qualifying expense has been identified.

31. The system of claim 1, wherein the data storage system is further configured to store one or more expenses in a substantiation list for third party review, wherein the interface computing system is configured to allow a third party reviewer to access and the expenses in the substantiation list, and wherein the networked computing system is further configured to utilize input from the third party reviewer to identify qualifying expenses.

32. The system of claim 31, wherein the interface computing system is further configured to allow the third party reviewer to identify substantiation information required from a user, wherein the interface computing system is further configured to notify a user of a need for the substation information, wherein the interface computing system is further configure to allow a user to submit the substantiation information, and wherein the data storage system is further configured to store the substantiation information submitted by the user.

33. The system of claim 32, wherein the substantiation information comprises a receipt, and wherein the interface computing system is configured to allow a user to upload a receipt image to the data storage system.

* * * * *